United States Patent
Venkatrao

(10) Patent No.: US 7,496,710 B1
(45) Date of Patent: Feb. 24, 2009

(54) REDUCING RESOURCE CONSUMPTION BY INEFFECTIVE WRITE OPERATIONS

(75) Inventor: Balakrishna Venkatrao, Sunnyvale, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 188 days.

(21) Appl. No.: 11/096,518

(22) Filed: Apr. 1, 2005

(51) Int. Cl.
*G06F 12/12* (2006.01)
*G06F 12/04* (2006.01)

(52) U.S. Cl. .................. 711/117; 711/133; 711/159
(58) Field of Classification Search .................. 711/117
See application file for complete search history.

(56) References Cited

U.S. PATENT DOCUMENTS

| | | | |
|---|---|---|---|
| 5,560,030 A * | 9/1996 | Guttag et al. ............... | 712/16 |
| 6,438,665 B2 * | 8/2002 | Norman .................... | 711/159 |
| 6,757,793 B1 | 6/2004 | Hughes et al. | |
| 6,785,154 B2 * | 8/2004 | Sunaga et al. .............. | 365/100 |
| 6,944,719 B2 | 9/2005 | Rowlands et al. | |
| 6,948,035 B2 | 9/2005 | Rowlands et al. | |
| 6,954,829 B2 | 10/2005 | Beers et al. | |
| 6,973,543 B1 | 12/2005 | Hughes | |
| 6,990,559 B2 | 1/2006 | Van Doren et al. | |
| 7,051,163 B2 | 5/2006 | Van Doren et al. | |

OTHER PUBLICATIONS

Prata, Stephen, "C Primer Plus, 5th Edition", Nov. 2004, Sams Publishing.*
Chang, Yeimkuan and Bhuyan, Laxmi, "Cache Memory Protocols", Dec. 27, 1999, John Wiley & Sons, "Wiley Encyclopedia of Electrical and Electronics Engineering", p. 697.*
"latency.", Dictionary.com Unabridged (v1.1), Jan. 2007, Random House, Inc.*

* cited by examiner

*Primary Examiner*—Reginald G Bragdon
*Assistant Examiner*—Eric Loonan
(74) *Attorney, Agent, or Firm*—Dorsey & Whitney LLP

(57) ABSTRACT

It has been discovered that preventing performance of ineffective write operations reduces demand on memory bandwidth, as well as preventing unnecessary consumption of resources. A write operation is inspected to determine whether the write operation will effectively modify the destination of the write operation (i.e., whether a net change will occur). Those ineffective write operations are not performed. Preventing performance of the write operation includes not changing contents of locations in a memory hierarchy that correspond to the destination of the write operation.

24 Claims, 4 Drawing Sheets

US 7,496,710 B1

REDUCING RESOURCE CONSUMPTION BY INEFFECTIVE WRITE OPERATIONS

BACKGROUND

1. Field of the Invention

The present invention relates to the field of computers. More specifically, the present invention relates to computer architecture.

2. Description of the Related Art

The increasing disparity between processor speeds and memory access speeds exacerbates the already heavy demand on memory bandwidth. In addition, the focus on throughput computing sensitive multi-core processor designs further increases the demand on memory bandwidth.

Write operations consume a significant portion of memory bandwidth. When a write operation is performed, the value of the write operation is written to cache as well as system memory. The moment when the value is written to system memory is dependent upon the write policy implemented, such as writeback versus write-through. Some write operations do not effectively change the corresponding location in system memory or cache. In other words, the write operation is writing the same value that already resides at the destination of the write operation. Although performance of such a write operation does not change the contents of the destination location, memory bandwidth is spent on the write operation, as well as other resources, such as resources expended unnecessarily firing write pins. Accordingly, a technique is desired to identify ineffective write operations and prevent their consumption of resources.

SUMMARY

It has been discovered that preventing performance of ineffective write operations reduces demand on memory bandwidth, as well as preventing unnecessary consumption of resources. Prior to writing to a destination, a write operation is inspected to determine if the write operation will not effectively modify its destination. If the write operation is an ineffective write operation, then essentially, the write operation is not performed. If the write operation will effectively modify its destination, then the write operation is performed in accordance with protocols and policies implemented on the executing system. By foregoing ineffective write operations, fewer write operations are performed, which improves availability of memory bandwidth. In addition, foregoing ineffective write operations facilitates fewer write pins being fired.

These and other aspects of the described invention will be better described with reference to the Description of the Drawing(s) and accompanying Figures.

BRIEF DESCRIPTION OF THE DRAWING(S)

The present invention may be better understood, and its numerous objects, features, and advantages made apparent to those skilled in the art by referencing the accompanying drawings.

The use of the same reference symbols in different drawings indicates similar or identical items.

DESCRIPTION OF THE DRAWING(S)

The description that follows includes exemplary systems, methods, techniques, instruction sequences and computer program products that embody techniques of the present invention. However, it is understood that the described invention may be practiced without these specific details. For instance, the described invention is described with reference to sniffing or snoopy coherency protocols, although the described invention may also be applied to a directory coherency protocol. In other instances, well-known protocols, structures and techniques have not been shown in detail in order not to obscure the invention.

Figure 1:
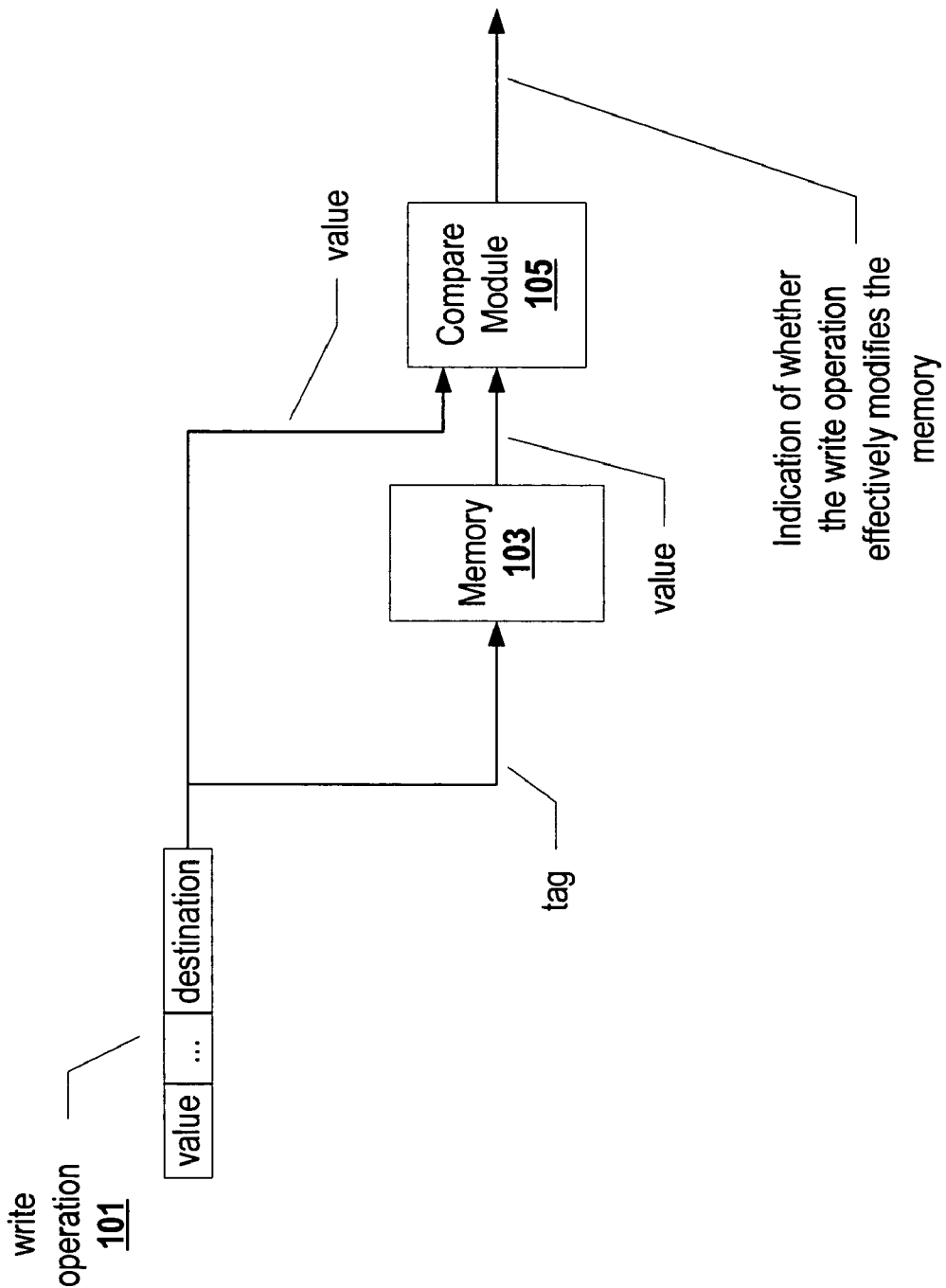
FIG. 1 depicts an exemplary system indicating whether a write operation is ineffective.

FIG. 1 depicts an exemplary system indicating whether a write operation is ineffective. A write operation 101 at least includes a value to be written and a destination where the value is to be written. A portion of the destination, such as the middle bits, are transmitted to a memory 103 as a tag. The tag is used to select a location in the memory 103 that corresponds to the destination of the write operation. The memory may be L1 cache, L2 cache, L3 cache, system memory, etc. Selection of the location in the memory will vary depending on the memory replacement policy being implemented by the system. (e.g., whether the memory is direct mapped or associative, if associative memory then the associativity, etc.). The value of the write operation 101 and the value at the selected location are both transmitted to a compare module 105. The compare module 105 compares the values and determines whether the write operation will effectively modify the target location (i.e., destination). If the write operation does not effectively modify the target location, or destination, then the write operation is not performed. Not performing a write operation may include not writing the value to both locations in a memory hierarchy (e.g., the destination in system memory as wells as the corresponding cache line). Not performing the write operation may include maintaining the status of the entry in the cache (e.g., not changing status of a cache line to dirty).

As already stated, foregoing ineffective write operations reduces the number of write operations that occupy memory bandwidth. Foregoing ineffective write operations also reduces expenditure of resources in performing the write operations, such as power to evict an entry from cache and write a new, albeit same, value, power and time to write to the destination in underlying memory, etc.

Figure 2:
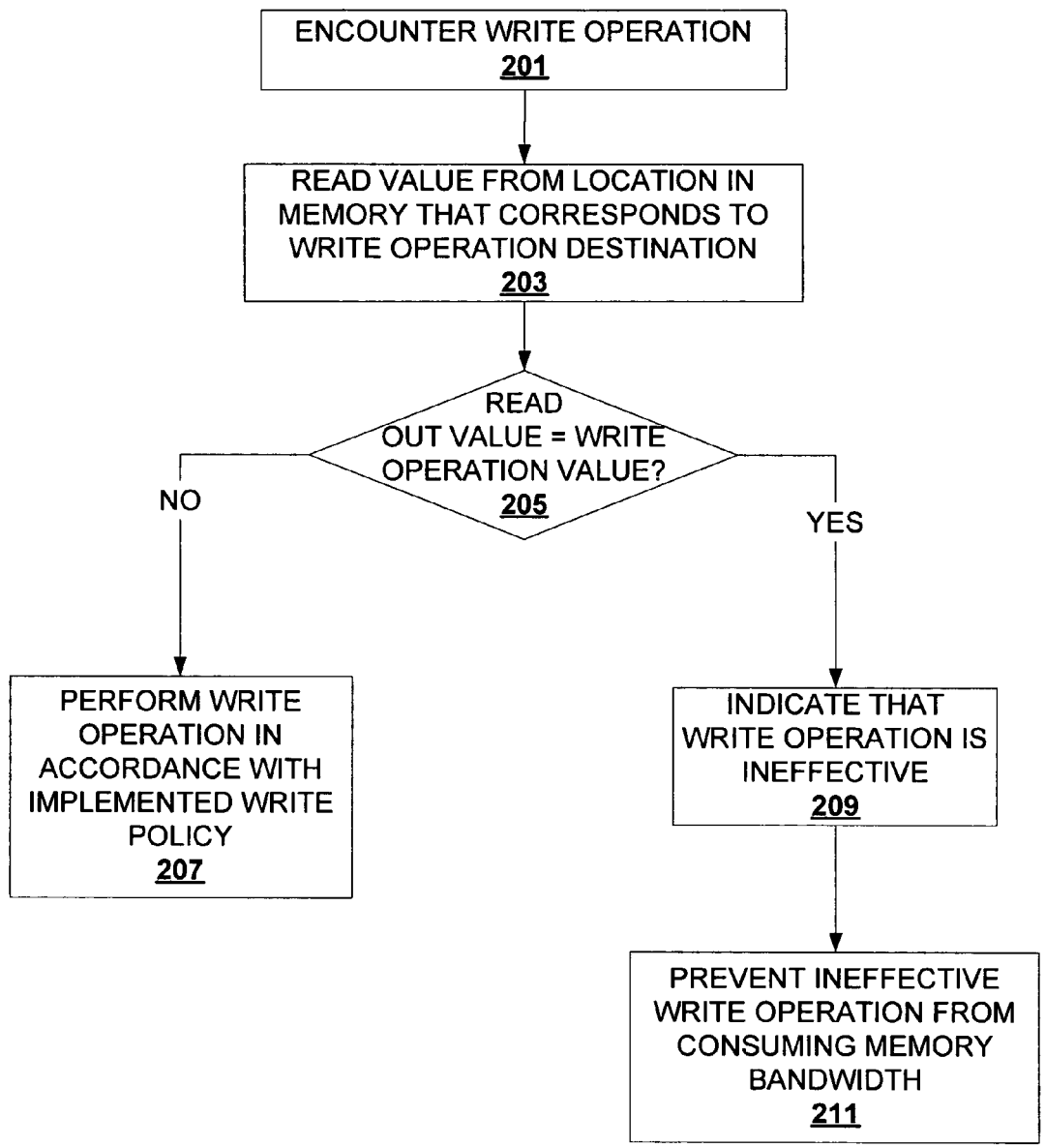
FIG. 2 depicts an exemplary flowchart for identifying ineffective write operations.

FIG. 2 depicts an exemplary flowchart for identifying ineffective write operations. At block 201, a write operation is encountered. At block 203, a value is read from a location in memory that corresponds to a destination of the write operation. At block 205, it is determined whether the value read out from the memory location is substantially similar to the value of the write operation. The values may be of different sizes (e.g., word, half-word, byte, etc.). Realizations may utilize a byte mask to compare values of different sizes. If the values do not substantially match, then control flows to block 207. If the values match substantially, then control flows to block 209.

At block 207, the write operation is performed in accordance with the implemented write policy (e.g., write-back, write-through, an intermediate write-through policy, etc.).

At block 209, the write operation is indicated as ineffective. For example, the location is not marked or updated, the location is set to 'valid' status, an indication is sent to a memory controller, a flag is set, etc. At block 211, the ineffective write operation is prevented from consuming memory bandwidth. If the write policy is write-back, then the current contents of the location are not marked as dirty and not evicted. Preventing eviction of a resident value from an ineffective write operation prevents the memory controller from performing a redundant write to system memory. In an exemplary system that implements a write-through write policy, a memory controller receives indication that an incoming or resident write operation is ineffective, and foregoes the write operation. In another exemplary illustration, a system may buffer write operations and write to system memory in batches. The memory controller invalidates those entries in the buffer that host ineffective write operations.

While the flow diagram shows a particular order of operations performed by certain realizations of the invention, it should be understood that such order is exemplary (e.g., alternative realizations may perform the operations in a different order, combine certain operations, overlap certain operations, perform certain operations in parallel, etc.).

Figure 3:
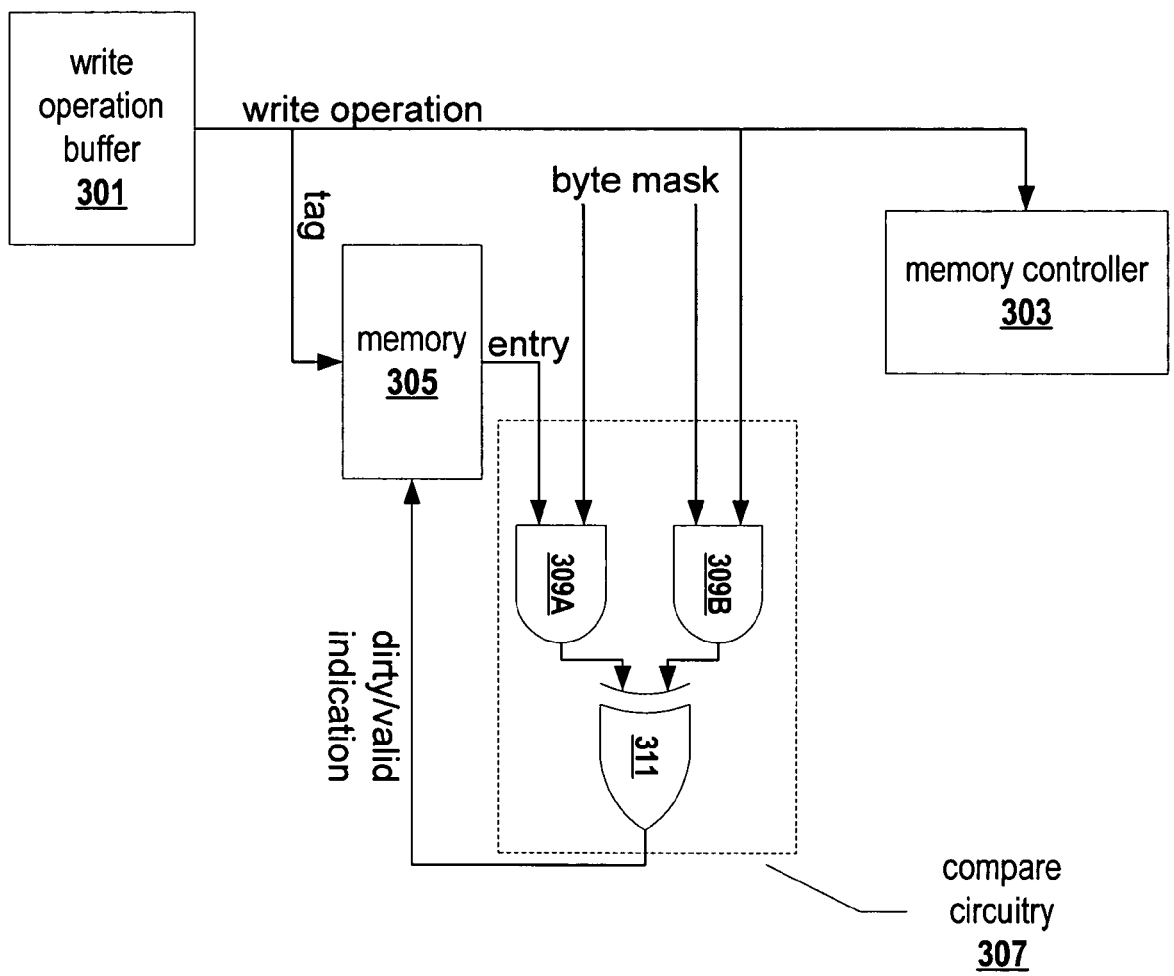
FIG. 3 depicts an exemplary compare circuitry to prevent ineffective write operations from consuming memory bandwidth.

FIG. 3 depicts an exemplary compare circuitry to prevent ineffective write operations from consuming memory bandwidth. A write operation buffer 301 (e.g., a store queue, a load/store queue, etc.) pops a write operation and sends the write operation to be performed by a memory controller 303. A tag from the write operation is input into a memory 305 (e.g., L1 cache, L2 cache, L3 cache, etc.). The memory 305 selects an entry in accordance with the tag and outputs the contents of the selected entry to a compare circuitry 307. The compare circuitry 307 includes a set of AND gates 309A and a set of AND gates 309B. The compare circuitry 307 also includes an XOR gate 311. The selected entry from the memory 305 is input into the set of AND gates 309A. A byte mask is also supplied to the set of AND gates 309A. A value from the write operation is input into the set of AND gates 309B of the compare circuitry 307. The byte mask is also supplied to the set of AND gates 309B. The byte mask is applied to facilitate comparison between values of different sizes (e.g., facilitate comparison of a half-word value with a word value). In an exemplary realization, each of the set of AND gates 309A and 309B comprises 32 gates with 1-bit output. Output from the sets of AND gates 309A-309B are input into the XOR gate 311. The output from the XOR gate 311 indicates either a 'dirty' or 'valid' status for the selected entry. This status indication is input into the memory 305 to mark the previously selected entry. For example, output from the compare circuitry 307 feeds into a conventional data/logic path of a processor used for performing store operations. Intelligently marking entries to indicate modification instead of reflexively marking entries as modified (i.e., "dirty") saves a substantial amount of bandwidth by foregoing writing of an entire cache line, which has no effect.

The described invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form (e.g., software, processing application) readable by a machine and/or cluster of machines (e.g., a computer or network of computers). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Figure 4:
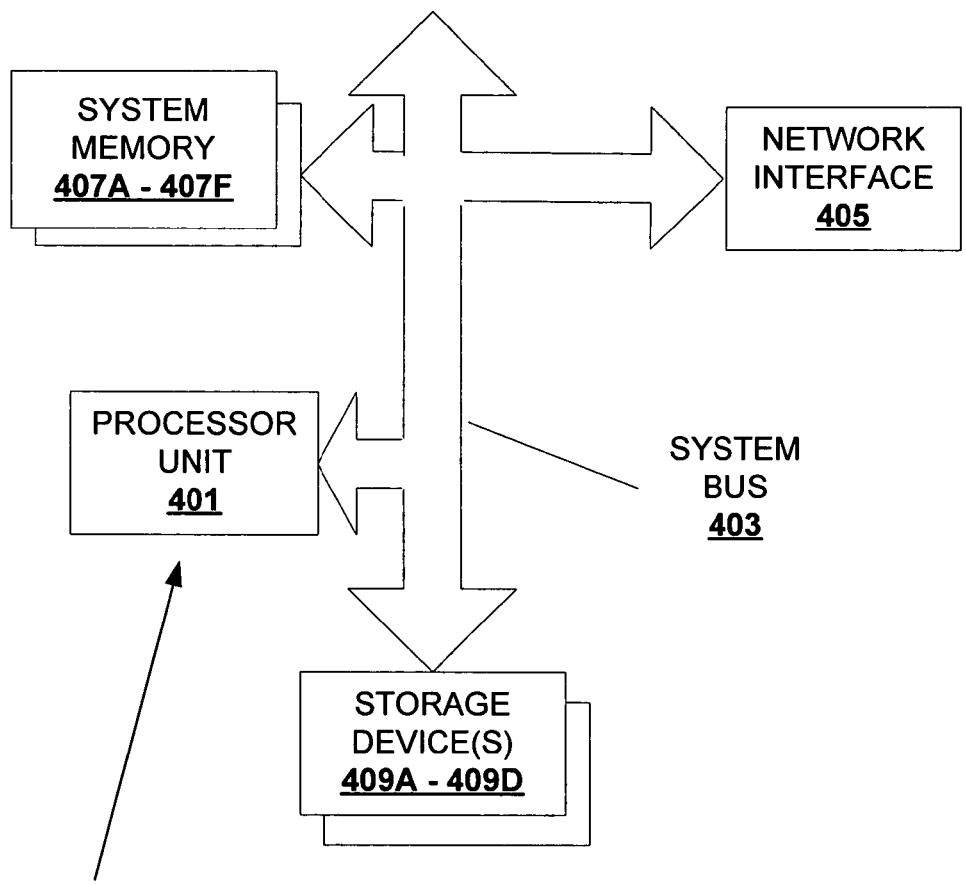
FIG. 4 depicts an exemplary computer system according to realizations of the invention.

FIG. 4 depicts an exemplary computer system according to realizations of the invention. A computer system includes a processor unit 401 (possibly including multiple processors, a single threaded processor, a multi-threaded processor, a multi-core processor, etc.). The computer system also includes a system memory 407A-407F (e.g., one or more of cache, SRAM, DRAM, RDRAM, EDO RAM, DDR RAM, EEPROM, etc.), a system bus 403 (e.g., LDT, PCI, ISA, etc.), a network interface 405 (e.g., an ATM interface, an Ethernet interface, a Frame Relay interface, etc.), and a storage device(s) 409A-409D (e.g., optical storage, magnetic storage, etc.). Realizations of the invention may include fewer or additional components not illustrated in FIG. 4 (e.g., video cards, audio cards, additional network interfaces, peripheral devices, etc.). The processor unit 401, the storage device(s) 409A-409D, the network interface 405, and the system memory 407A-407F are coupled to the system bus 403. The processor unit 401 includes a compare circuitry to indicate ineffective write operation and avoid bandwidth consumption by ineffective write operations. A portion or all of the compare circuitry functionality may be emulated with instructions embodied in the system memory 407A-407F and/or the processor unit 401 (e.g., assembly instruction(s), firmware, etc.). Compare circuitry emulation may include one or more instructions to compare values of write operations and values of corresponding entries in a cache. The software emulation may also mark write operations as ineffective.

While the invention has been described with reference to various realizations, it will be understood that these realizations are illustrative and that the scope of the invention is not limited to them. Many variations, modifications, additions, and improvements are possible. For example, the described invention has presumed write operations between cache and system memory, although the described invention may be applied at any level of a memory hierarchy. The underlying memory may be persistent storage. Hence, write operations that are ineffective, as determined with values from system memory, are not written to corresponding locations in persistent storage. Similarly, the underlying memory may be L2 cache instead of system memory. Hence, values from L1 cache are compared with values of write operations destined for L2 cache, and the values of ineffective write operations are not written to the L2 cache. More generally, realizations in accordance with the present invention have been described in the context of particular realizations. These realizations are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A method of avoiding ineffective memory operations, the method comprising:

in a memory hierarchy comprising a cache memory and a main memory, evicting a first value from a location in a first cache memory responsive to a write operation, if performance of the write operation effectively modifies the location;

applying a mask to the first and second value to compare the values, wherein the first and second values are of different sizes; and avoiding performing the write operation if the write operation does not effectively modify the location, wherein the application of the mask indicates that the first and second values are substantially the same.

2. The method of claim 1 further comprising determining whether the write operation effectively modifies the location.

3. The method of claim 2, wherein the determining comprises comparing the first value with a second value to be written in accordance with the write operation.

4. The method of claim 3 further comprising marking the location as dirty if the first and second values do not match.

5. The method of claim 3, wherein the evicting comprises writing the first value to a location in a second cache memory and writing the second value to the location in the first cache memory, wherein the first cache memory is above the second cache memory in the memory hierarchy.

6. The method of claim 1, wherein the evicting is in accordance with a memory coherency protocol that includes MSI, MOSI, MESI, or MOESI.

7. A computer-readable storage medium not including signals containing computer-executable instructions which, when executed, perform the method of claim 1.

8. An apparatus comprising:
a first memory of a memory hierarchy; and
a compare circuitry coupled with the first memory to compare values resident in the first memory with values of write operations and to indicate which of the write operations do not effectively modify the first memory, the compare circuitry further configured to apply a mask to the values resident in the first memory with values of write operation, wherein the values resident in the first memory are of a different size than the values of the write operation, and wherein the indication of which operations do not effectively modify the first memory is based on the values resident in the first memory and the values of the write operation being substantially the same.

9. The apparatus of claim 8 further comprising a write buffer operable to host write operations, wherein the write buffer is coupled with the compare circuitry.

10. The apparatus of claim 8 further comprising a memory controller coupled with the compare logic, the memory controller operable to perform those write operations that effectively modify the first memory.

11. The apparatus of claim 10, wherein the memory controller is further operable to prevent the write operations indicated as ineffective from modifying a second memory, wherein the first memory is above the second memory in the memory hierarchy of the apparatus.

12. The apparatus of claim 11, wherein the first memory is of a lower latency than the second memory.

13. The apparatus of claim 8, wherein the compare circuitry is further operable to mark as dirty only those locations in the first memory that are effectively modified by the write operations and to refrain from marking those locations in the first memory that correspond to the ineffective write operations.

14. The apparatus of claim 8, wherein the first memory includes L1 cache, L2 cache, L3 cache, system memory, or persistent storage.

15. The apparatus of claim 8, wherein the compare circuitry includes a set of one or more AND gates and an XOR gate coupled with the set of AND gates.

16. The apparatus of claim 15, wherein the output of the logic gates sets a dirty/valid bit of a location in the first memory.

17. The apparatus of claim 8 further comprising a processor that includes the compare circuitry.

18. The apparatus of claim 17 wherein the compare circuitry determines whether a first value of the write operation matches a second value resident at a location in the memory that corresponds to a destination of the write operation.

19. The apparatus of claim 18 wherein the processor further comprises a mask circuit configured to apply masks to compare the first and second values, which are of different sizes.

20. The apparatus of claim 17 wherein the processor further comprises a circuit configured to implement a writeback write policy and mark only those entries effectively modified by the write operations.

21. The apparatus of claim 17 wherein the write operations that do not effectively modify the first memory result in foregoing evicting values resident at the respective memory locations.

22. A computer program product embodied on one or more machine-readable storage media not including signals, the computer program product comprising:
a first sequence of instructions executable to determine whether performance of a write operation would effectively modify a location in a first memory of a memory hierarchy, wherein the first sequence of instructions are further executable to apply a mask to a first value of the write operation with a second value residing at the first memory location to allow comparison, wherein the first and second values are of different sizes;
comparing the first and second values and indicating whether the first and second values substantially match; and
a second sequence of instructions executable to selectively forego those write operations determined to be ineffective by the first sequence of instructions when the first and second values substantially match.

23. The computer program product of claim 22, wherein the second sequence of instructions are executable to prevent writeback for a write operation if the first sequence of instructions indicates that the write operation does not effectively modify a location in a first memory.

24. The computer program product of claim 22 further comprising the second sequence of instructions executable to mark the first memory location as dirty if the first sequence of instructions determines that the write operation would effectively modify the first memory location.

* * * * *